(12) United States Patent
Miyazaki et al.

(10) Patent No.: US 7,383,932 B2
(45) Date of Patent: Jun. 10, 2008

(54) CLUTCH HUB

(75) Inventors: Tomoyuki Miyazaki, Kakegawa (JP);
Kiyokazu Ichikawa, Fukuroi (JP);
Yosuke Ikeda, Shimada (JP)

(73) Assignee: NSK-Warner K.K., Tokyo (JP)

(*) Notice: Subject to any disclaimer, the term of this patent is extended or adjusted under 35 U.S.C. 154(b) by 249 days.

(21) Appl. No.: 11/220,728

(22) Filed: Sep. 8, 2005

(65) Prior Publication Data

US 2006/0054448 A1 Mar. 16, 2006

(30) Foreign Application Priority Data

Sep. 9, 2004 (JP) ............................. 2004-262669

(51) Int. Cl.
*F16D 13/60* (2006.01)
*F16D 13/72* (2006.01)

(52) U.S. Cl. .................................. 192/70.12; 192/70.2

(58) Field of Classification Search ............... 192/70.2; 475/146; 29/893.34, 893.33
See application file for complete search history.

(56) References Cited

U.S. PATENT DOCUMENTS 5,706,694 A * 1/1998 Bhookmohan et al. .. 192/70.12
2001/0047917 A1* 12/2001 Murata ...................... 192/70.2

FOREIGN PATENT DOCUMENTS

| JP | 05-141446 | 6/1993 |
| JP | 07-133830 | 5/1995 |
| JP | 2001-232435 | 8/2001 |

* cited by examiner

Primary Examiner—Rodney H Bonck
(74) Attorney, Agent, or Firm—Miles & Stockbridge P.C.

(57) ABSTRACT

A clutch hub provided with a side wall at an end of a cylindrical portion. The cylindrical portion is formed to have convexed and concaved portions to serve as a spline and an oil passage is formed on a tooth of the spline. An oil dam is formed by plastic deformation on the inner peripheral surface of the tooth of the spline with the oil passage formed thereon at a position separated from an open end by a predetermined distance, concaved grooves are formed on the outer peripheral surface of the spline with the oil dam formed thereon.

5 Claims, 7 Drawing Sheets

CLUTCH HUB

This application claims the benefit of Japanese Patent application No. 2004-262669 which is hereby incorporated by reference.

BACKGROUND OF THE INVENTION

1. Field of the Invention

The present invention relates to a clutch hub used in, for example, a wet-type multiple disc clutch, or the like.

2. Related Background Art

An automatic transmission for a vehicle is generally equipped with a planetary gear transmission mechanism of three to five speed levels, in addition to a torque converter which serves as a fluid coupling, and speed change is conducted by properly locking or releasing a constituent element (such as a sun gear or a planetary gear) of the planetary gear transmission mechanism with a clutch or a brake.

As a clutch or a brake to be installed inside the automatic transmission, a wet-type multiple disc in which friction plates and separator plates are arranged alternately is employed, except in some type of band type brakes. A pressure oil from a transmission control hydraulic circuit is used for pressure fitting (frictional engagement) between the two kinds of plates. A wet-type multiple disc clutch is used in an automatic two-wheeled vehicle as a power connecting and disconnecting clutch since a comparatively great amount of torque can be obtained with a smaller area and a smooth connection can be easily attained with such a clutch.

Incidentally, as disclosed in Japanese Patent Application Laid-Open Nos. 7-133830, 2001-232435 and 5-141446, a clutch hub is formed as a spline with a cylindrical portion which is deformed to have concaved and convexed portions. A plurality clutch plates are engaged with this spline to be movable in the axial direction. Then, clutch plates engaged with a spline of a cylinder member to be movable in the axial direction and the aforementioned clutch plates are arranged alternately.

A wet-type multiple disc clutch using this clutch hub is arranged to, when a piston provided inside the cylinder member is driven and both the clutch plates are brought into frictional engagement, or when the frictional engagement between these clutch plates is released, transmit a torque on the input shaft side to a rotating portion on the driven side through the clutch hub or to intercept this torque transmission.

Oil passages are properly formed on teeth of the spline of the clutch hub, and the clutch hub passes oil which is retained on the rear surfaces of the teeth through the oil passages by centrifugal force generated upon rotation thereof, so as to guide the oil onto frictional engagement surfaces of the clutch plates.

This clutch hub is arranged, as disclosed in Japanese Patent Application Laid-Open Nos. 7-133830, 2001-232435 and 5-141446, to have an oil dam which is formed by pressing at an opening end of the tooth of the spline on which the oil passage is formed or in the vicinity thereof, so as to prevent the oil from flowing to the opening side of the clutch hub so that most of the oil is caused to pass through the oil passage and the frictional engagement surface is effectively lubricated.

However, if the aforementioned oil dam is processed by plastic deformation, the precision of the spline on the outer diameter side of the clutch hub with which a pair of frictional engagement elements such as clutch plates are brought into fitting is generally deteriorated. As a result, the engagement or the release of engagement of the pair of frictional engagement elements such as clutch plates could not be performed smoothly.

Particularly, in the pressing work of the oil dam which is disclosed in Japanese Patent Application Laid-Open No. 7-133830, tooth contours of the spline are deformed when the oil dam is produced which causes troubles with movement of the pair of frictional engagement elements such as clutch plates at the engagement or the release of engagement. As a result, the gear shifting performance could be changed and an idling drag could be increased.

SUMMARY OF THE INVENTION

The present invention is contrived taking such circumstances as described above, and an object thereof is to provide a clutch hub which can correct tooth contours of a spline with precision by forming grooves after processing of an oil dam, and can be utilized by the spline up to an end surface thereof.

In order to achieve the above object, according to the present invention there is provided a clutch hub which is provided with a side wall at an end of a cylindrical portion, in which the cylindrical portion is formed to have concaved and convexed portions to serve as a spline and an oil passage is formed on a tooth of the spline, characterized in that:

the oil dam is formed by plastic deformation on the inner peripheral surface of the tooth of the spline with the oil passage formed thereon at a position separated from an opening end by a predetermined distance; and subsequently, concaved grooves are formed on the outer peripheral surface of the spline with the oil dam formed thereon.

In a clutch hub according to the present invention, the oil dam is preferably formed by plastic deformation by shaving work from an open end.

In a clutch hub according to the present invention, the shaving work is preferably conducted by one pressing operation.

In a clutch hub according to the present invention, the oil dam is preferably processed by plastic work from the outer side thereof.

In a clutch hub according to the present invention, the concaved grooves are preferably processed by plastic work.

In a clutch hub according to the present invention, the concaved groove has preferably an amount for which deteriorated precision of the tooth contour of the spline generated by the plastic work of the oil dam can be corrected by plastic deformation.

In a clutch hub according to the present invention, the concave grooves are preferably formed on the crescent and the trough of the outer peripheral surface of the spline.

BRIEF DESCRIPTION OF THE DRAWINGS

FIGS. 2A to 2C show a state after formation of an oil dam on the clutch hub and before formation of concaved grooves, in which FIG. 2A is a plan view of the essential portion of the clutch hub shown in FIG. 1, FIG. 2B a side view, and FIG. 2C is a sectional view thereof;

FIGS. 3A to 3C show a state after formation of the oil dam on the clutch hub and after formation of the concaved grooves, in which FIG. 3A is a plan view of the essential portion of the clutch hub shown in FIG. 1, FIG. 3B a side view, and FIG. 3C is a sectional view thereof;

FIGS. 6A to 6C show a clutch hub according to a second embodiment of the present invention for illustrating a state after formation of the oil dam on the clutch hub and after formation of the concaved grooves, in which FIG. 6A is a plan view of the essential portion of the clutch hub, FIG. 6B a side view, and FIG. 6C is a sectional view thereof.

DETAILED DESCRIPTION OF THE PREFERRED EMBODIMENTS

A clutch hub according to an embodiment of the present invention will be described below with reference to drawings.

First Embodiment

Figure 1:
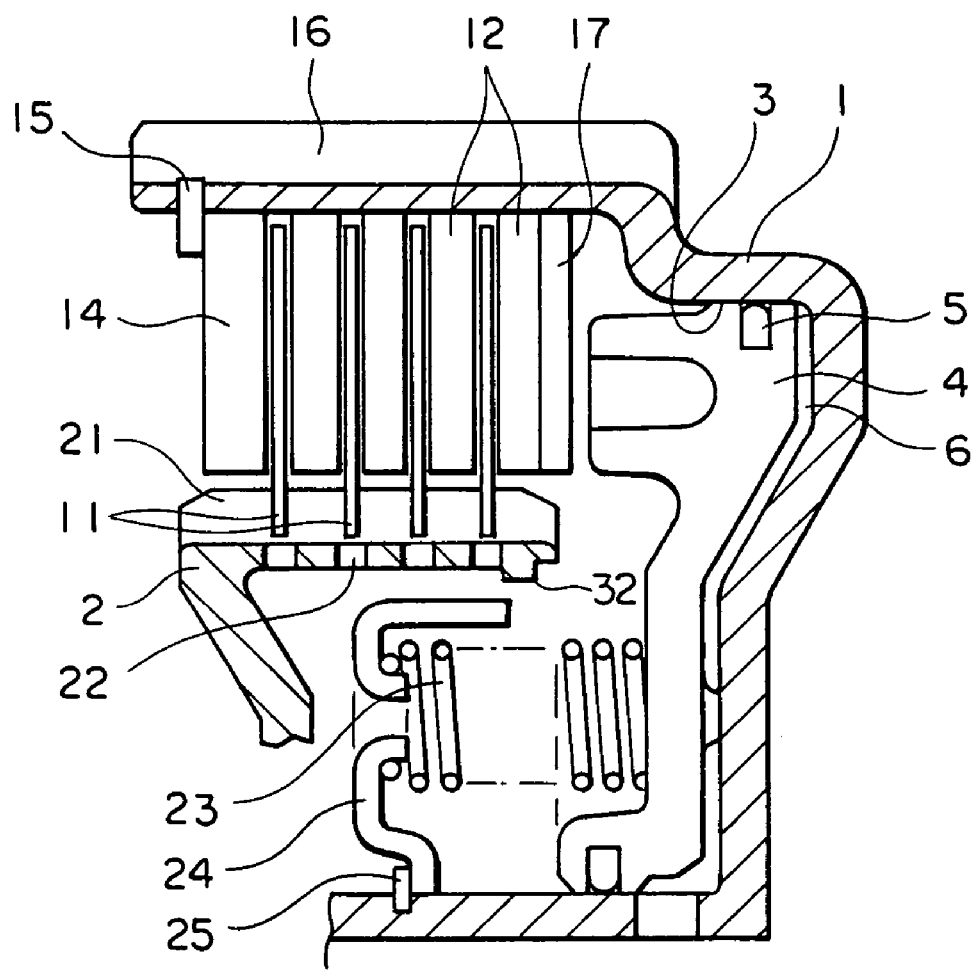
FIG. 1 is a longitudinal sectional view of the essential portion of a wet-type multiple disc clutch according to a first embodiment of the present invention.

FIG. 1 is a longitudinal sectional view of the essential portion of a wet-type multiple disc clutch according to the first embodiment of the present invention.

As shown in this drawing, the wet-type multiple disc clutch comprises a cylindrical clutch case 1 which is connected to an input shaft or the like, a clutch hub 2 which is connected to a constitutional element or the like of a planetary gear transmission mechanism, and a piston 4 which is slidably fitted in a cylinder 3 formed on the tip end side (the right side in FIG. 1) of the clutch case 1.

In FIG. 1, a referential numeral 5 denotes an O ring which seals a gap between the cylinder 3 and the piston 4, and 6 denotes an oil chamber into which pressure oil coming from an unrepresented transmission control hydraulic circuit is introduced.

As shown in FIG. 1, a plurality of separator plates 12 and one backing plate 14 are held by the clutch case 1 to be slidable. A snap ring 15 is used to prevent these separator plates 12 and the backing plate 14 from being drawn out.

Referring to FIG. 1, a referential numeral 16 denotes a female spline which is formed on the inner peripheral surface of the clutch case 1, and 17 a leaf spring which is interposed between the piston 4 and the separator plates 12.

On the other hand, a plurality of friction plates 11 are held by the clutch hub 2 to be slidable in such a manner that they are interposed between the separator plates 12 and the backing plate 14.

Referring to FIG. 1, a referential numeral 21 denotes a male spline which is formed on the outer peripheral surface of the clutch hub 2, and 22 oil supply holes for communicating the inner and outer surfaces of the clutch hub 2 with each other. A referential numeral 23 denotes a return spring, 24 a support metal, and 25 a snap ring.

Figure 2A:
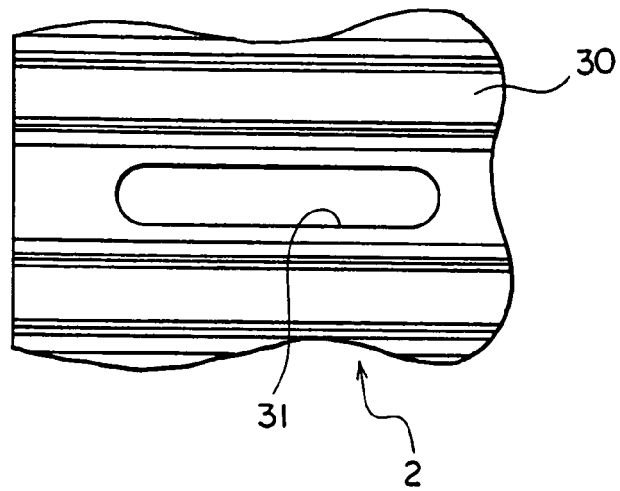
Figure 2B:
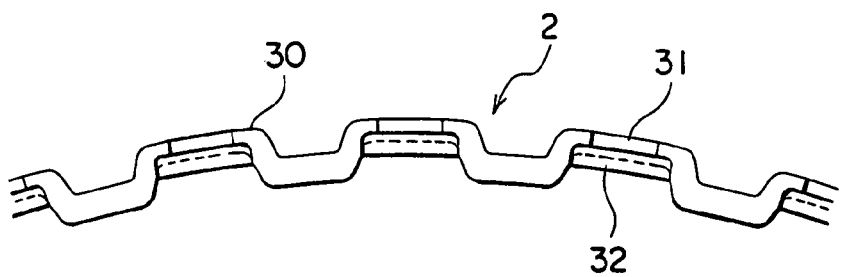
Figure 2C:
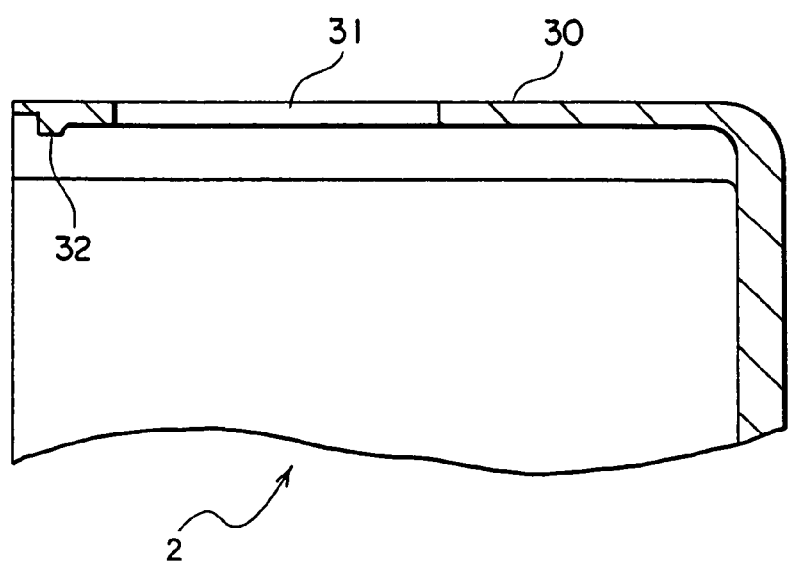

FIGS. 2A to 2C show a state after formation of an oil dam on the clutch hub and before formation of concaved grooves, in which FIG. 2A is a plan view of the essential portion of the clutch hub shown in FIG. 1, FIG. 2B a side view, and FIG. 2C is a sectional view thereof.

As shown in FIGS. 2A, 2B and 2C, a cylindrical portion serving as the clutch hub 2 is formed to have concaved and convexed portions as a spline 30, and oil passages 31 are formed on teeth of this spline 30.

An oil dam 32 is formed to be projected inward in the radial direction by plastic deformation on the inner peripheral surface of each tooth of the spline 30 with this oil passage 31 formed thereon at a position separated from an open end by a predetermined distance.

The oil dam 32 is formed by plastic deformation caused by shaving from the open end. This shaving is conducted by one pressing operation.

Figure 3A:
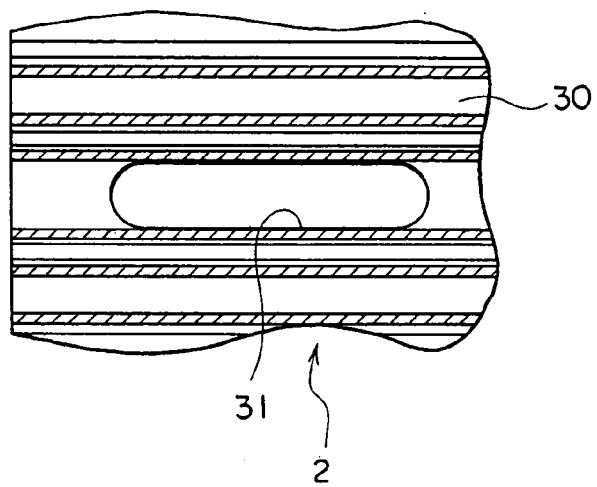
Figure 3B:
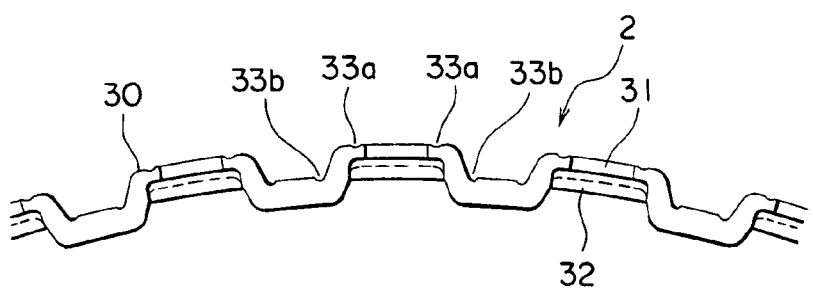
Figure 3C:
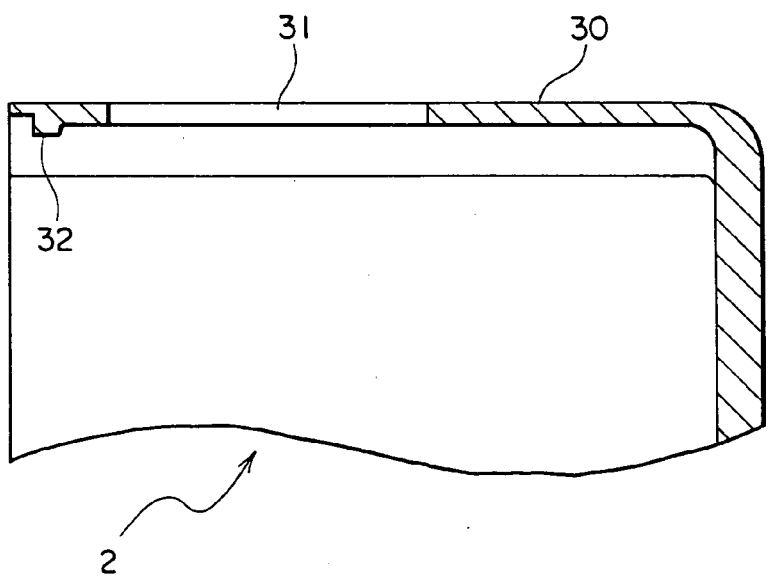

FIGS. 3A to 3C show a state after formation of an oil dam on the clutch hub and after formation of the concaved grooves, in which FIG. 3A is a plan view of the essential portion of the clutch hub shown in FIG. 1, FIG. 3B a side view, and FIG. 3C is a sectional view thereof.

Figure 4:
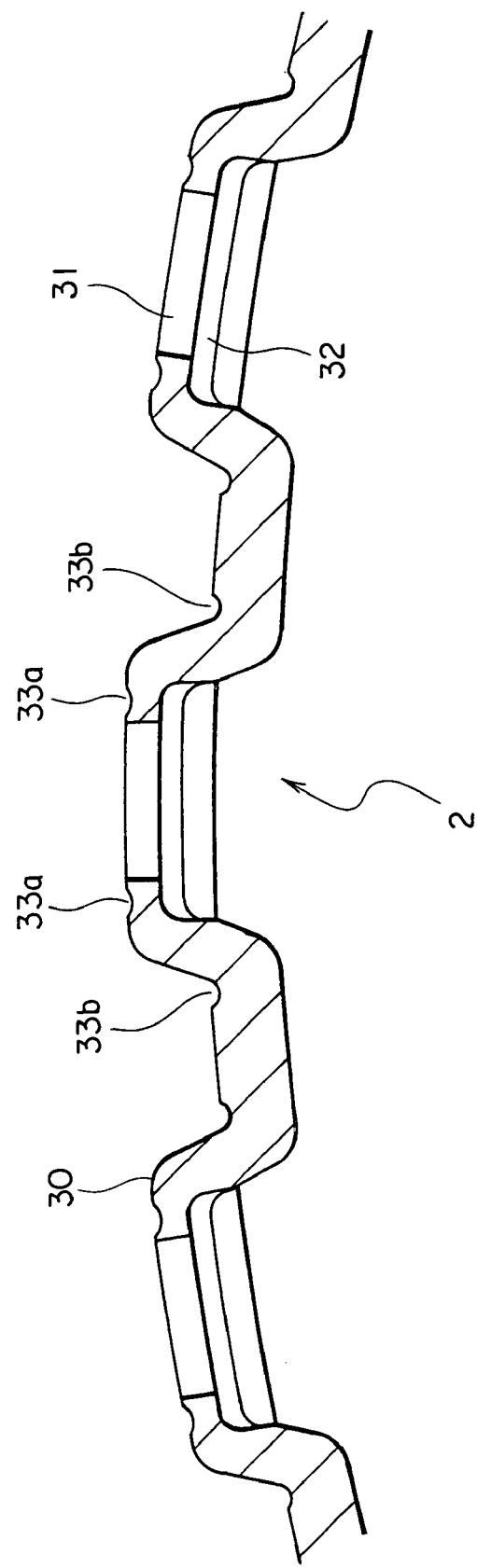
FIG. 4 is a sectional view showing the portion shown in FIG. 3B in an enlarged manner.

FIG. 4 is a sectional view showing the portion shown in FIG. 3B in an enlarged manner.

As shown in FIGS. 3A, 3B and 3C and FIG. 4, concaved grooves 33a and 33b (extended in the axial direction) are formed by plastic working on the outer peripheral surface of the spline 30 with the oil dam 32 formed thereon to be extended in the axial direction on both sides of the oil passage 31.

As described above, it is possible to correct with precision a tooth contour of the spline 30 generated by the plastic working of the oil dam 32 by forming the axially extended concaved grooves 33a and 33b after the processing of the oil dam 32, and to make good use of the spline 30 up to an end surface thereof.

Further, as shown in FIGS. 3A, 3B and 3C and FIG. 4, the axially extended concaved grooves 33a and 33b are formed to have the crest and the trough of the outer peripheral surface of the spline 30.

Deterioration in precision of the tooth contour of the spline 30 which is caused by the plastic working of the oil dam 32 can be corrected by plastic deformation caused by the axially extended concave grooves 33a and 33b.

Figure 5A:
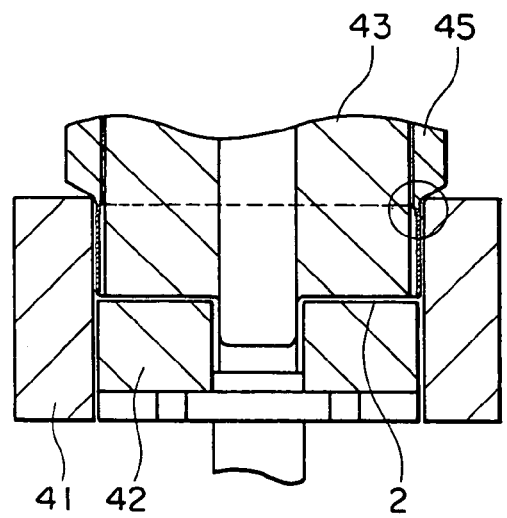
FIG. 5A is a schematic sectional view of a die for plastically processing the oil dam and the concaved grooves.
Figure 5B:
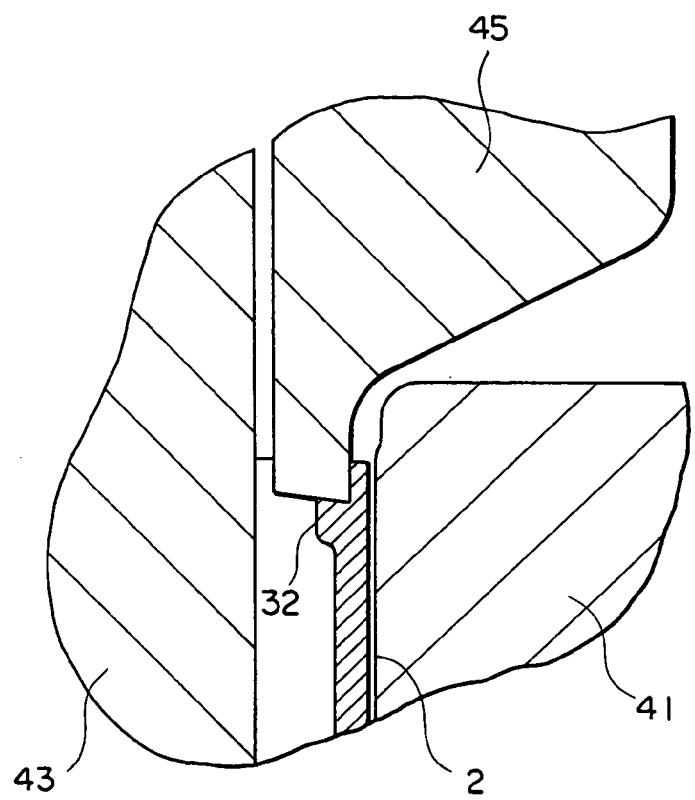
FIG. 5B is a sectional view showing an encircled portion in FIG. 5A in an enlarged manner.
Figure 5C:
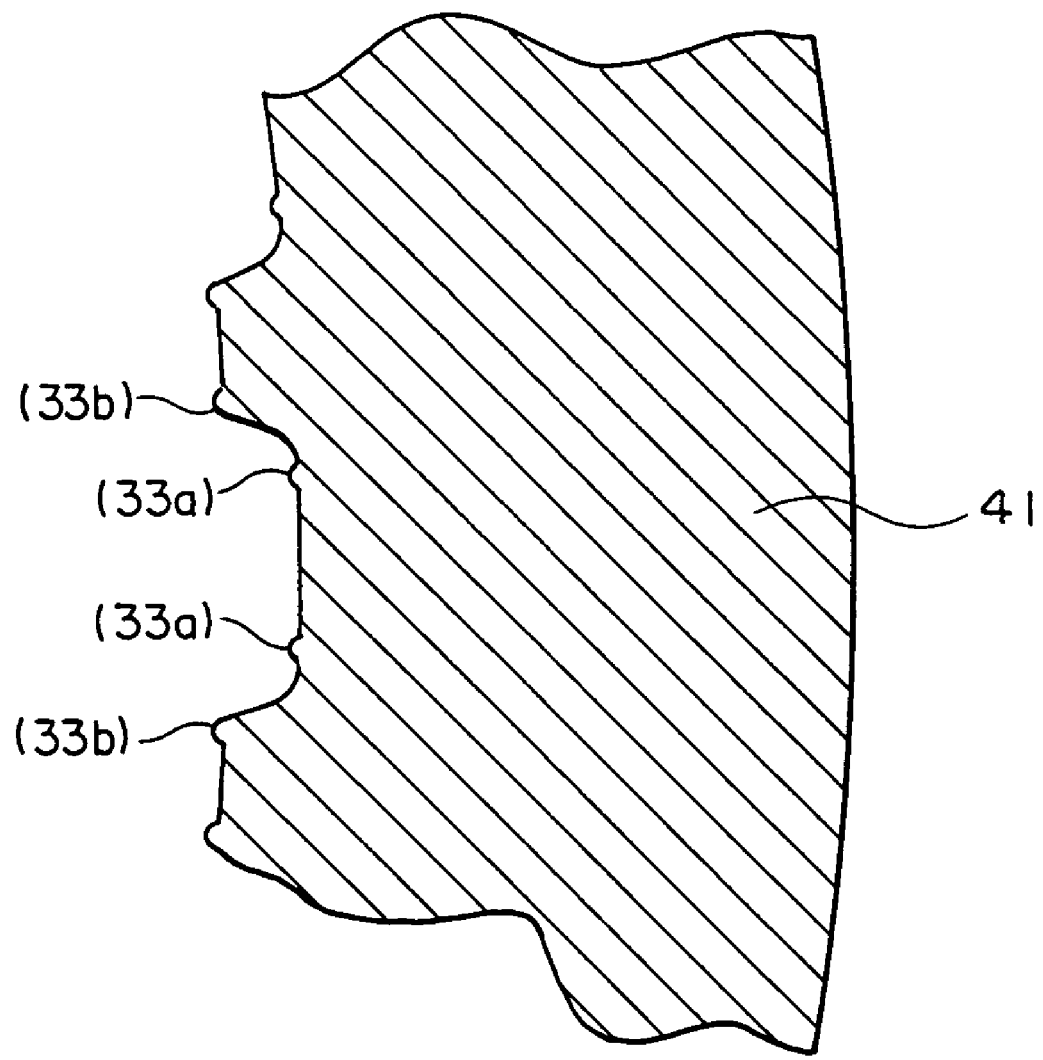
FIG. 5C is a schematic sectional view showing a shape in plan view of a die for forming the concave grooves.

FIG. 5A is a schematic sectional view of a die for plastically processing the oil dam and the axially extended concave grooves, FIG. 5B is a sectional view showing an encircled portion in FIG. 5A in an enlarged manner, and FIG. 5C is a sectional view showing a shape in plan view of a die 41.

As shown in FIG. 5A, a cylindrical die 41 on the outer radius side is disposed on the outer radius side of the clutch hub 2, a die 42 on a side wall side is disposed on the side wall side of the clutch hub 2, and a die 43 on the inner radius side is disposed on the inner radius side of the clutch hub 2. As shown in FIGS. 5A and 5B, a shaving jig 45 is disposed on the outer side in the axial direction of the clutch hub 2. The oil dam 32 is formed by plastic deformation by shaving from the open end, and this shaving is conducted by a single pressing operation with using the shaving jig 45. Then, the clutch hub 2 is formed with splines by the dies 41 and 43, and at the same time the clutch hub 2 is formed with the concaved grooves 33a, 33b at the outer periphery by the die 41. For this purpose, the die 41 has at the inner periphery the projections (33a), (33b) for forming the respective concaved grooves 33a, 33b in addition to the spline forming portion. Thus, it is possible to correct deteriorated precision of the tooth contour of the spline 30 which is caused by the plastic working of the oil dam 32 by conducting the plastic working of the concaved grooves 33a and 33b.

Second Embodiment

Figure 6A:
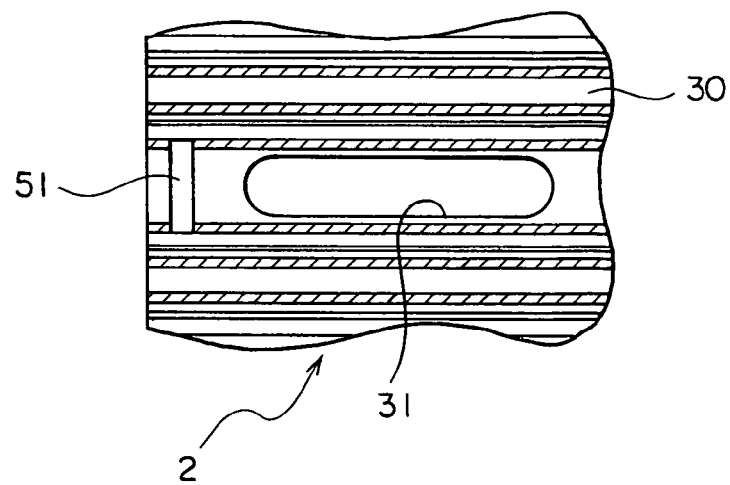
Figure 6B:
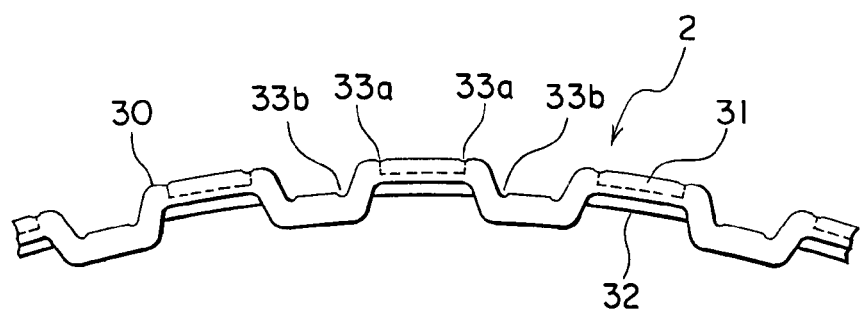
Figure 6C:
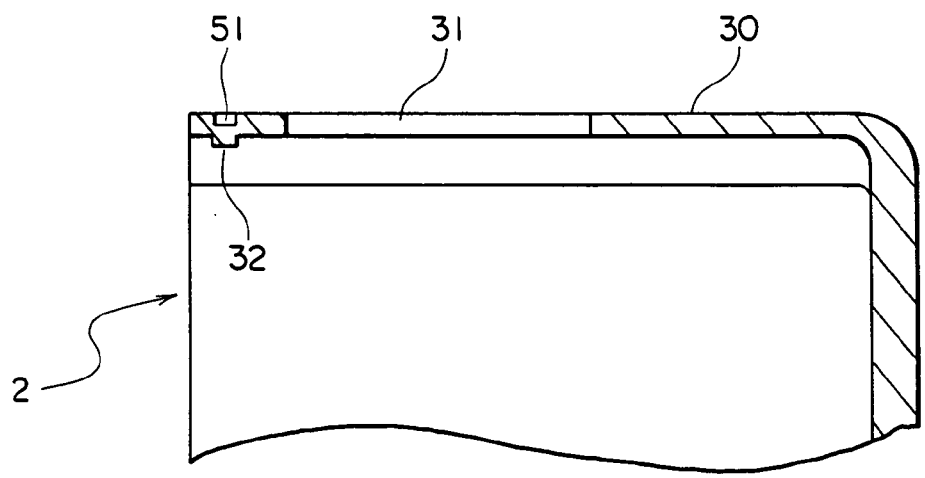

FIGS. 6A to 6C show a clutch hub according to the second embodiment of the present invention for illustrating a state after formation of the oil dam on the clutch hub and after formation of the axially extended concave grooves, in which FIG. 6A is a plan view of the essential portion of the clutch hub, FIG. 6B a side view, and FIG. 6C is a sectional view thereof.

In the present embodiment, the oil dam 32 is formed by forming a groove 51 by plastic work on the outer peripheral surface of the tooth of the spline 30.

This concaved groove 51 is formed at a position corresponding to an outer part in the radial direction of the oil dam 32. As described above, it is possible to correct the tooth contour of the spline 30 which is generated by plastic work of the oil dam 32 with precision by forming the concave grooves 33a and 33b after the processing of the oil dam 32, and also to make good use of the spline 30 up to the end surface thereof.

Note that the present invention is not limited to the foregoing embodiments, but can be changed in various manners.

What is claimed is:

1. A clutch hub for use in a wet-type multiple disc clutch assembly that has a cylindrical clutch case with a female spline formed on an inner peripheral surface of the clutch case, the clutch hub having a sidewall and an opening at respective ends of a cylindrical portion, an outer peripheral surface of which is formed with a male spline radially opposed to the female spline, the clutch assembly having friction plates and separator plates alternately disposed to be slidable on the female spline and the male spline, the male spline of the clutch hub being formed by radially convex and concave portions defining crests and troughs, respectively, of spline teeth, the crests having oil passages therethrough, the clutch hub having oil dams formed as deformations of inner peripheral surfaces of the crests at a position between the opening and the sidewall of the clutch hub, the clutch hub being characterized by:

first and second pairs of concave grooves that modify deformation of the spline teeth due to forming of the oil dams;

the first pairs of concave grooves extending axially on outer peripheral surfaces of corresponding crests along opposite edge regions thereof; and the second pairs of concave grooves extending axially on outer peripheral surfaces of corresponding troughs along opposite edge regions thereof.

2. A clutch hub according to claim 1, wherein the oil dam deformations are formed by plastic working in a shaving operation from the opening.

3. A clutch hub according to claim 2, wherein the shaving is conducted by one pressing operation.

4. A clutch hub according to claim 1, wherein the oil dam deformations are formed by plastic working from an outer side of the crests.

5. A clutch hub according to claim 1, wherein the concave grooves are formed by plastic working.

* * * * *